July 1, 1958 J. C. RODGERS ET AL 2,841,057
PARTITION ASSEMBLING MACHINES
Filed Aug. 29, 1955 13 Sheets-Sheet 1

INVENTORS
John C. Rodgers
Walter Kiwi
BY

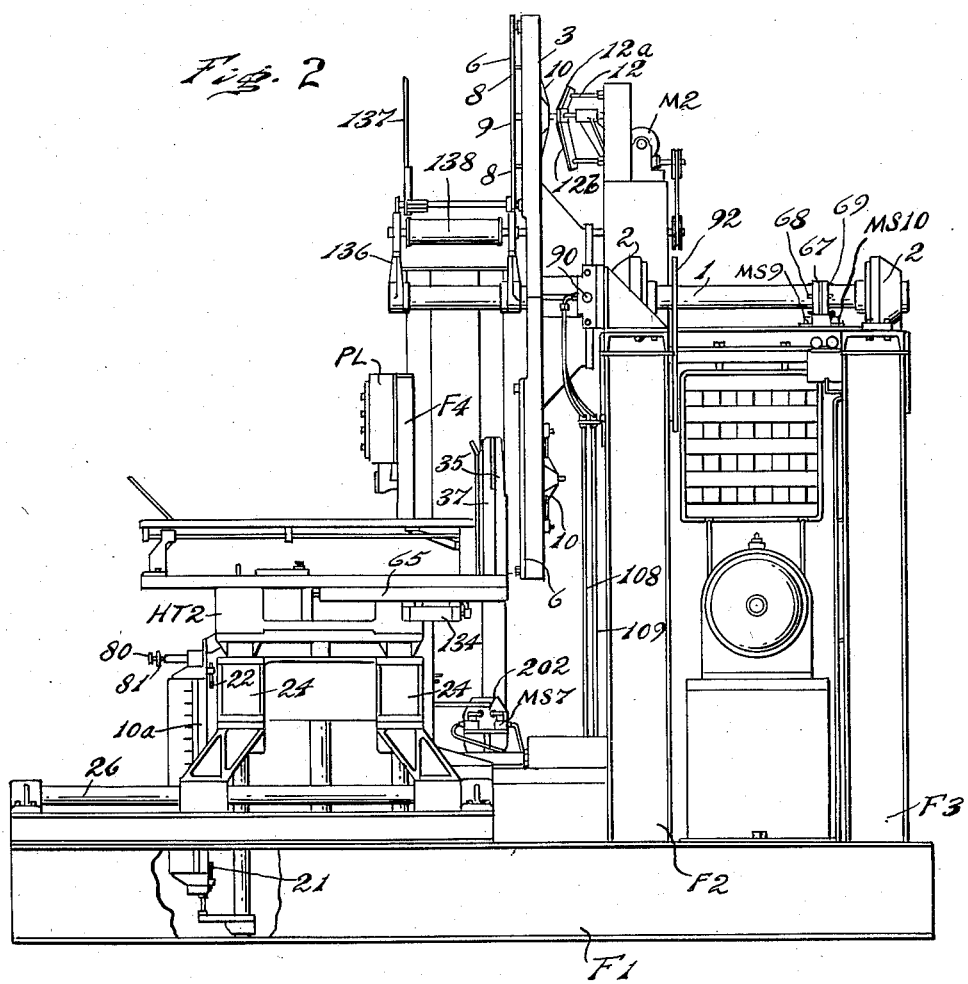

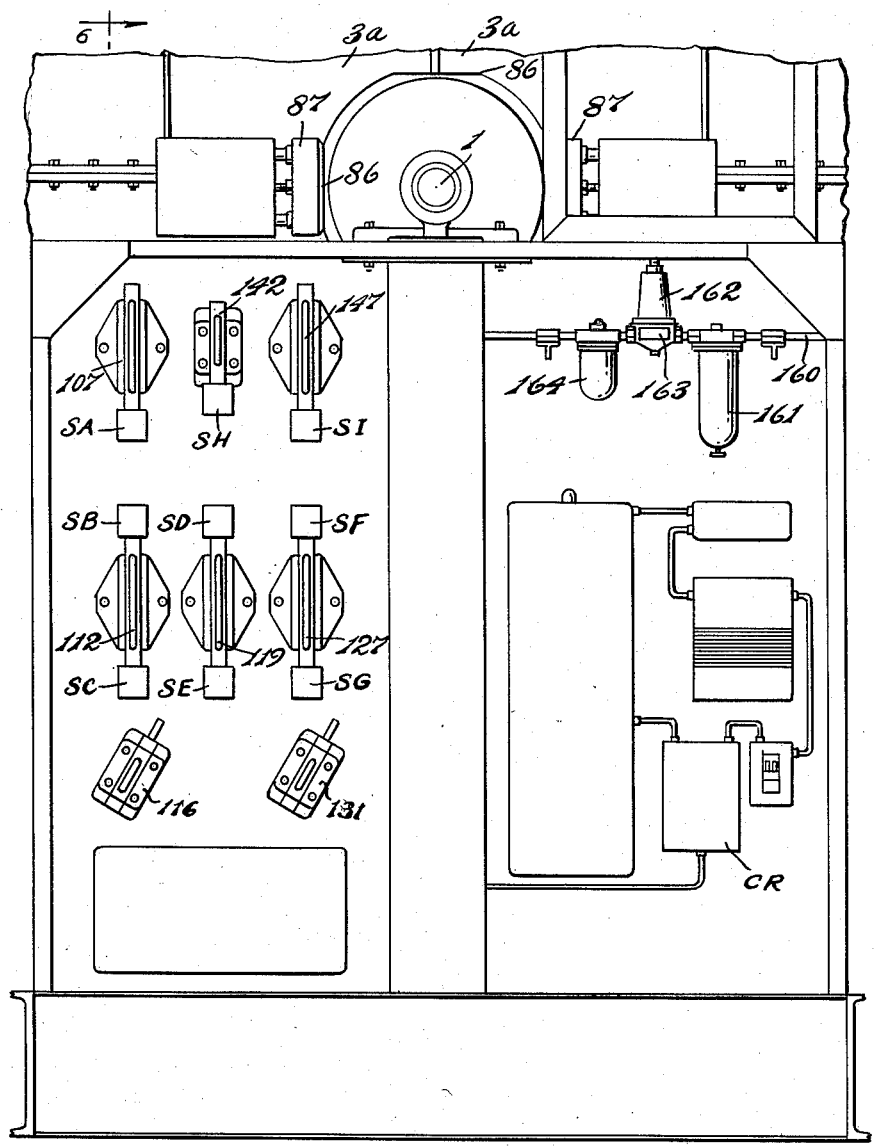

July 1, 1958　　J. C. RODGERS ET AL　　2,841,057
PARTITION ASSEMBLING MACHINES
Filed Aug. 29, 1955　　13 Sheets-Sheet 4

INVENTOR.
John C. Rodgers
Walter Kiwi
BY
B. T. Wolfensmith
Attorney

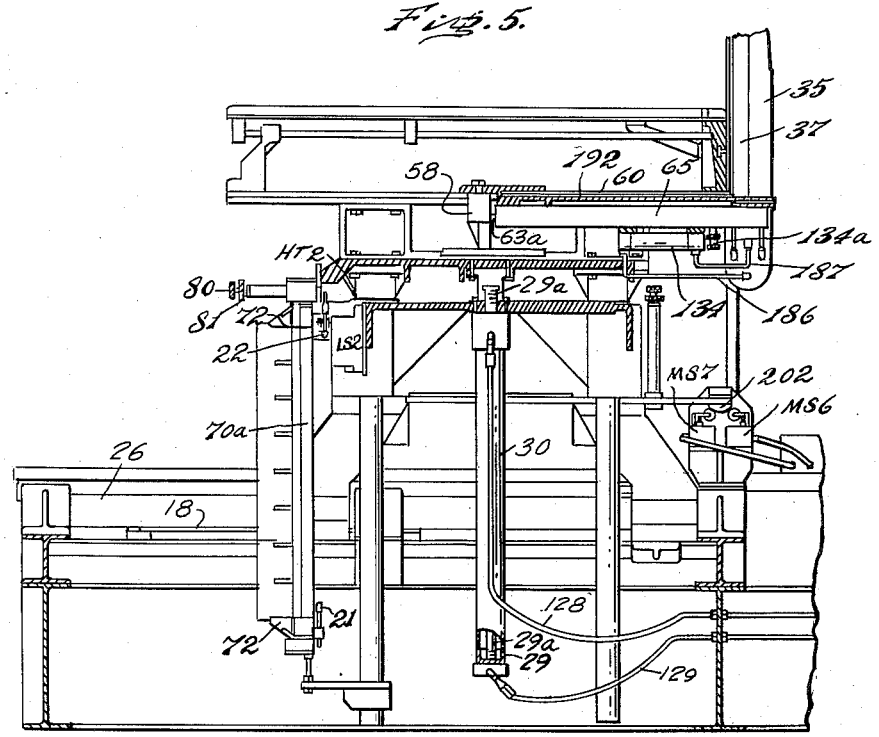

July 1, 1958  J. C. RODGERS ET AL  2,841,057
PARTITION ASSEMBLING MACHINES
Filed Aug. 29, 1955  13 Sheets-Sheet 6
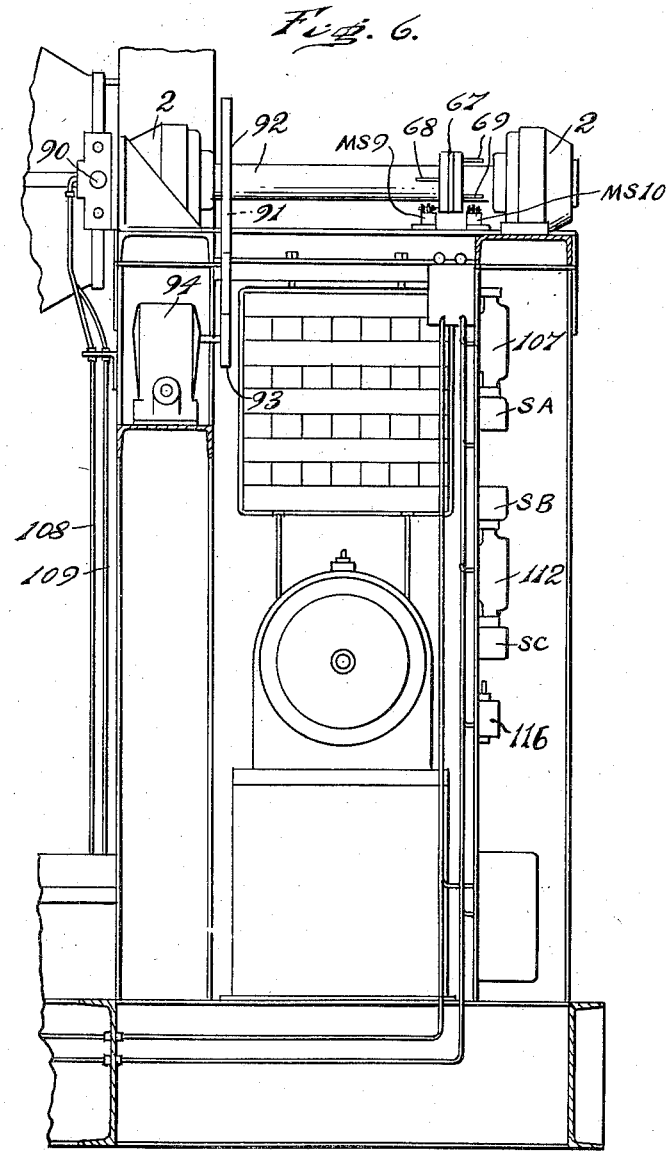
INVENTORS:
John C. Rodgers
Walter Kiwi
BY

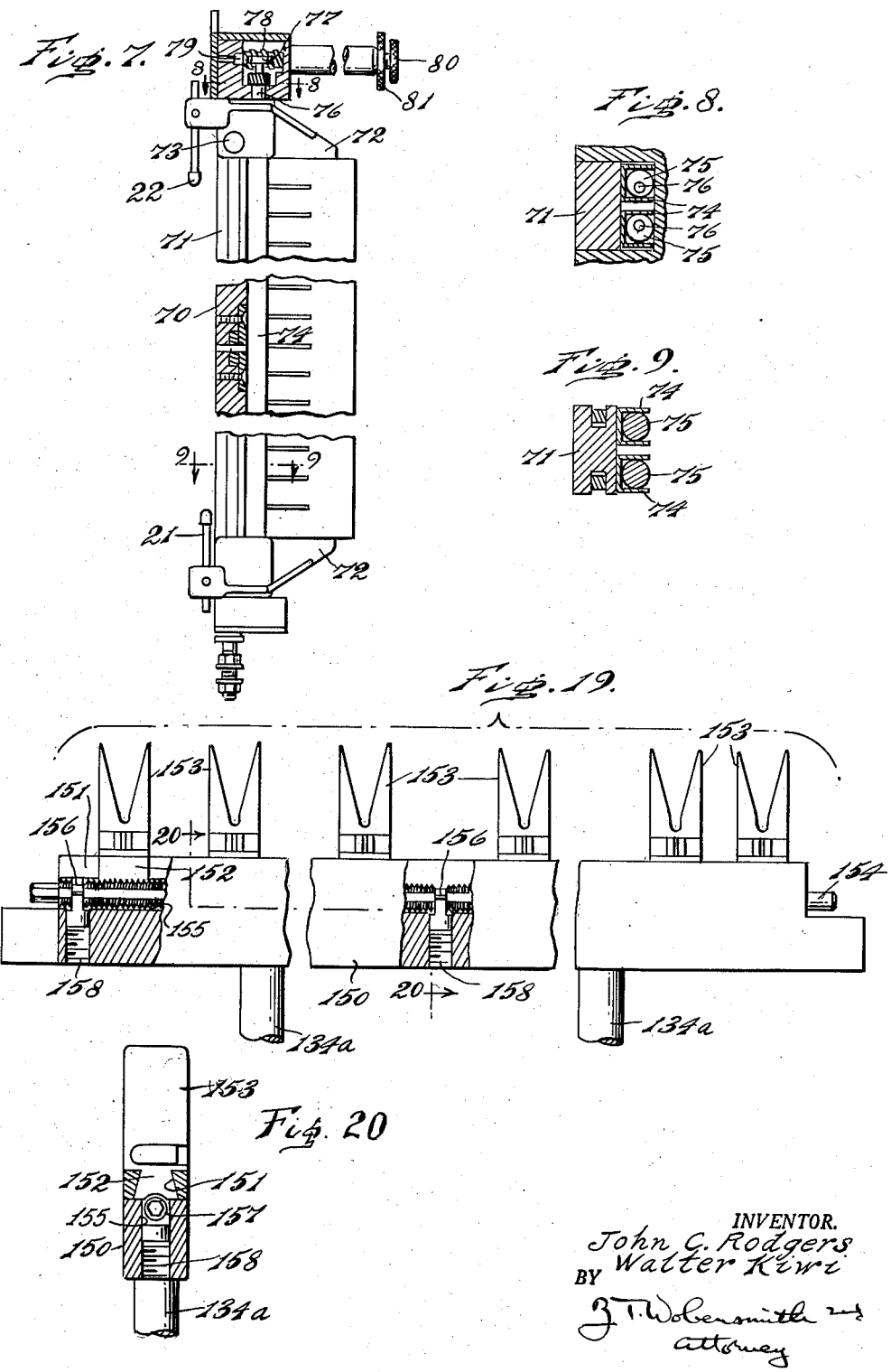

July 1, 1958 J. C. RODGERS ET AL 2,841,057
PARTITION ASSEMBLING MACHINES
Filed Aug. 29, 1955 13 Sheets-Sheet 8
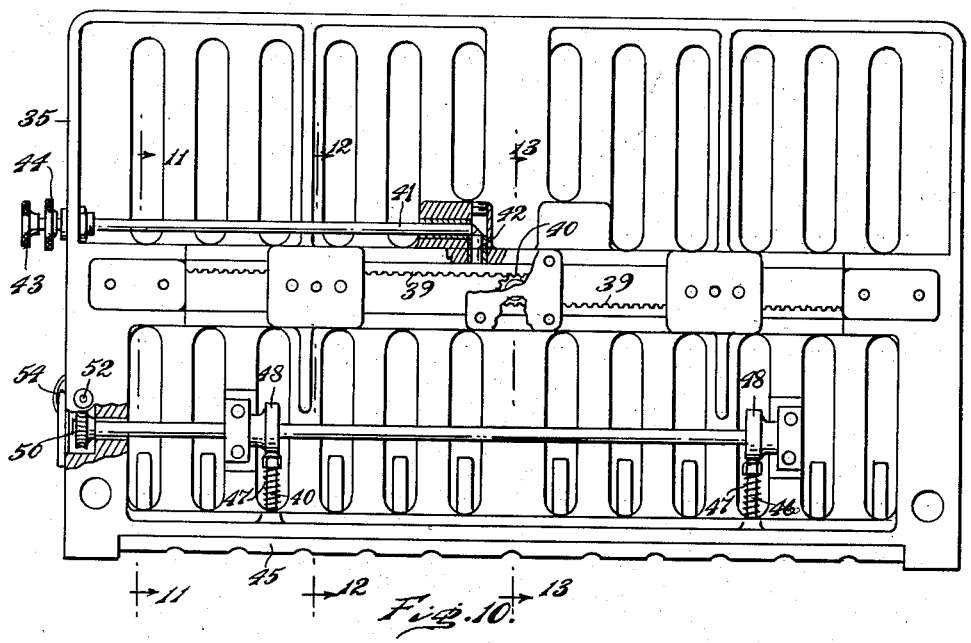
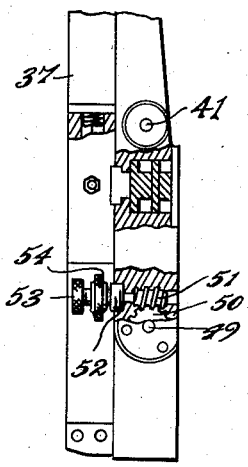 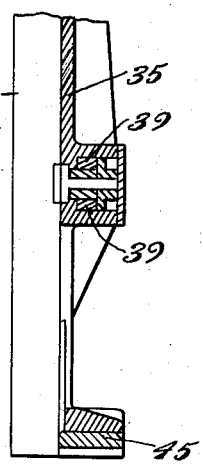 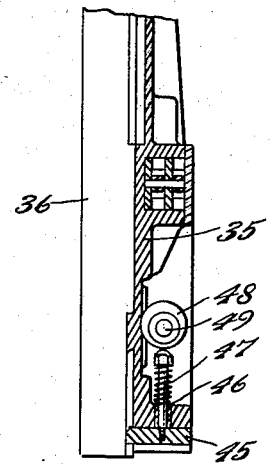
INVENTORS
John C. Rodgers
Walter Kiwi
BY INVENTORS:
John C. Rodgers
Walter Kiwi
BY

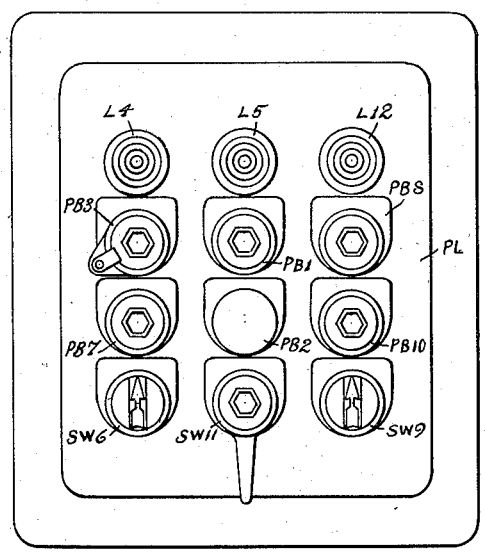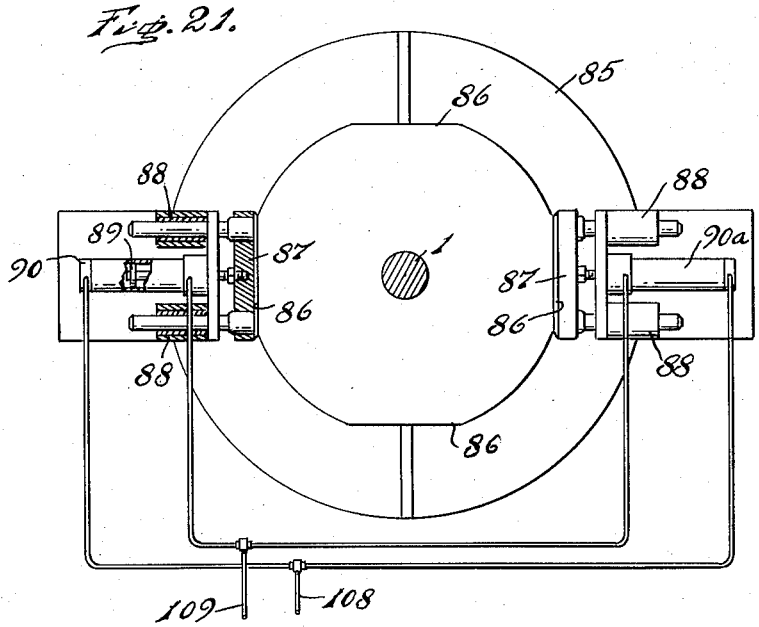

July 1, 1958 J. C. RODGERS ET AL 2,841,057
PARTITION ASSEMBLING MACHINES
Filed Aug. 29, 1955 13 Sheets-Sheet 11
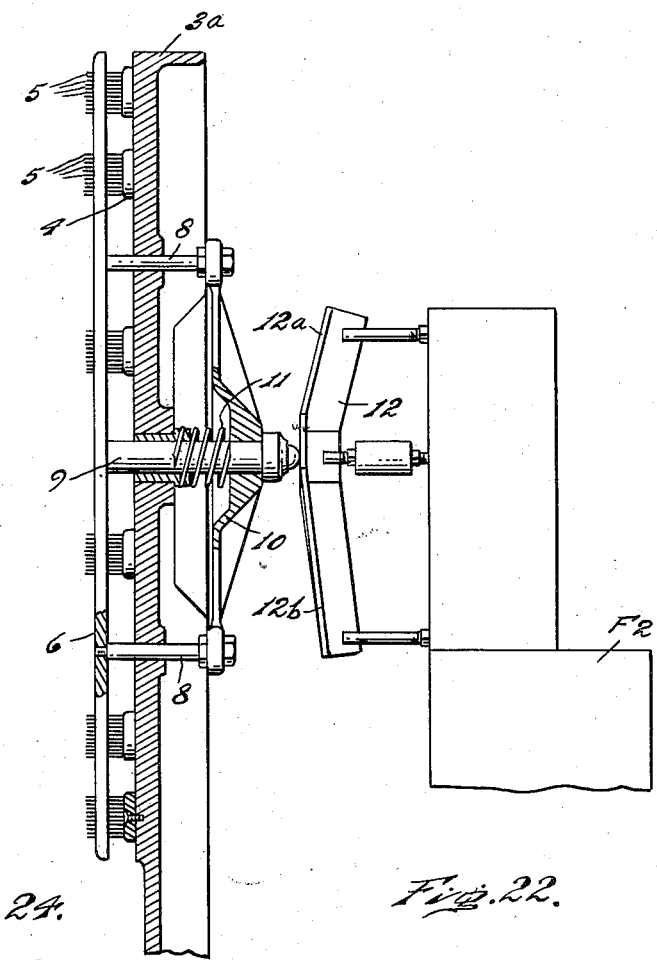
Fig. 24. Fig. 22.
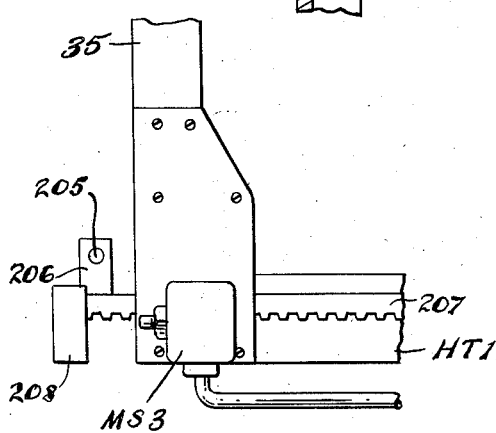
INVENTORS
John C. Rodgers
Walter Kiwi
BY
Attorney July 1, 1958

J. C. RODGERS ET AL 2,841,057

PARTITION ASSEMBLING MACHINES

Filed Aug. 29, 1955

INVENTOR.
John C. Rodgers
Walter Kirt
BY

United States Patent Office 2,841,057
Patented July 1, 1958

2,841,057
PARTITION ASSEMBLING MACHINES

John C. Rodgers, North Hills, and Walter Kiwi, Torresdale Manor, Pa., assignors to Huntingdon Industries Incorporated, Meadowbrook, Pa., a corporation of Pennsylvania Application August 29, 1955, Serial No. 531,148

9 Claims. (Cl. 93—38)

This invention relates to machines for assembling partition strips in crossed relation.

Partition assemblies are widely and commonly used for separating and protecting various articles during transportation and storage. These partition assemblies are composed of partition boards having slots cut about half the distance across the width thereof and are assembled by pressing one slotted side of a partition board to the slotted side of an adjacent board in rows and columns, and usually perpendicular, to provide square, rectangular or other shaped cells.

The different articles packaged in such partition assemblies are of many sizes and shapes so that endless dimensional differences may be required.

Various machines have heretofore been proposed for assembling partitions in crossed relation and these machines, in the main, have been of either of two types: (1) single purpose machines which merely made up one type and size of partition unit or (2) multipurpose machines, which by suitable adjustments and setting up could be used for different types and sizes of partition assemblies for which they have been adjusted or set up. Machines of the latter type available up to this time, because of their complexity of construction, have required a long time to set up or prepare for use so that for small runs their use was not practicable.

It is the principal object of the present invention to provide a machine for assembling partitions which may be quickly and automatically adjusted to accommodate a large range of sizes and types of partition boards or strips.

It is a further object of the present invention to provide a partition assembling machine having an improved hopper table.

It is a further object of the present invention to provide a partition assembling machine having an improved hopper table control.

It is a further object of the present invention to provide a partition assembling machine which is capable of handling partition boards or strips of different thicknesses, of different widths and of different lengths, and, if desired, a plurality of different strips, at a particular location or locations.

It is a further object of the present invention to provide a partition assembling machine having an improved structure for supporting partition strips for assembly.

It is a further object of the present invention to provide a partition assembling machine having an improved turret head and mounting therefor.

It is a further object of the present invention to provide a partition assembling machine having an improved turret head actuating and controlling mechanism.

It is a further object of the present invention to provide a partition assembling machine having an improved partition strip feeding structure.

It is a further object of the present invention to provide a partition assembling machine which is sturdy, compact and reliable.

It is a further object of the present invention to provide a partition assembling machine in which typical partition strips for a particular assembled unit are utilized as patterns for controlling the operation of the machine.

It is a further object of the present invention to provide a partition assembling machine having an improved control of the operations thereof.

It is a further object of the present invention to provide a partition assembling machine having controls by which the operations can be interrupted, resumed, or modified, at any time, as desired.

Other objects and advantageous features of the invention will be apparent from the specification and claims.

The nature and characteristic features of the invention will be more readily understood from the following description, taken in connection with the accompanying drawings forming part thereof, in which:

Fig. 2 is a side elevational view of the machine shown in Fig. 1, as seen from the right;

Fig. 3 is a rear elevational view of the machine shown in Fig. 1;

Fig. 5 is a vertical sectional view taken approximately on the line 5—5 of Fig. 1;

Fig. 6 is a vertical sectional view taken approximately on the line 6—6 of Fig. 3;

Fig. 7 is a side elevational view of one of the index frame assemblies for pattern indexing, parts being broken away to show the details of construction;

Fig. 8 is a horizontal sectional view taken approximately on the line 8—8 of Fig. 7;

Fig. 9 is a horizontal sectional view taken approximately on the line 9—9 of Fig. 7;

Fig. 10 is a rear elevational view of the front gate assembly for one of the hopper tables, parts being broken away to show the details of construction;

Fig. 11 is a vertical sectional view taken approximately on the line 11—11 of Fig. 10;

Fig. 12 is a vertical sectional view taken approximately on the line 12—12 of Fig. 10;

Fig. 13 is a vertical sectional view taken approximately on the line 13—13 of Fig. 10;

Fig. 19 is a top plan view of board aligning structure employed in connection with the invention, parts being broken away to show the details of construction;

Fig. 20 is a sectional view taken approximately on the line 20—20 of Fig. 19;

Fig. 21 is a fragmentary view partly in elevation and partly in section illustrating the holding and positioning structure for the turret;

Fig. 22 is a fragmentary vertical sectional view showing the stripping mechanism;

Fig. 24 is a fragmentary side elevational view showing another portion of the control mechanism;

Fig. 25 is an enlarged front elevational view of the control panel;

It should, of course, be understood that the description and drawings herein are illustrative merely, and that various modifications and changes may be made in the structure disclosed without departing from the spirit of the invention.

Like numerals refer to like parts throughout the several views.

The machine of the present invention functions in substantially the following manner:

Partition strips are stored ready for use at two different locations in spaced relation in front of the vertical face of a turret.

At one station a plurality of partition strips are fed from those at one location to holding structure on the turret and mounted on the holding structure at different levels and in accordance with the finished product desired.

The turret is partially rotated and the group of strips as thus mounted is moved to a second station where other partition strips are supplied thereto and assembled therewith while at the same time additional strips are supplied to the first station.

The turret is again partially rotated to bring the partition assembly to a third station while at the same time the two prior mentioned operations are being repeated at the two prior stations.

The turret is again partially rotated and at the fourth station the partition units are stripped from the holders for delivery by a conveyor belt.

Operations are repeated at each of the first, second and fourth stations with step by step advance of the turret between feeding operations.

Referring now more particularly to the drawings, a main frame F is provided, having a horizontal base portion F1, and vertical uprights F2 and F3, a horizontal turret shaft 1 being rotatably mounted in bearings 2 on the uprights F2 and F3.

A vertically disposed turret 3, preferably assembled from four similar plates 3a, is provided, secured to the turret shaft 1 and rotatable in a vertical plane on the shaft 1 as an axis.

Figure 1:
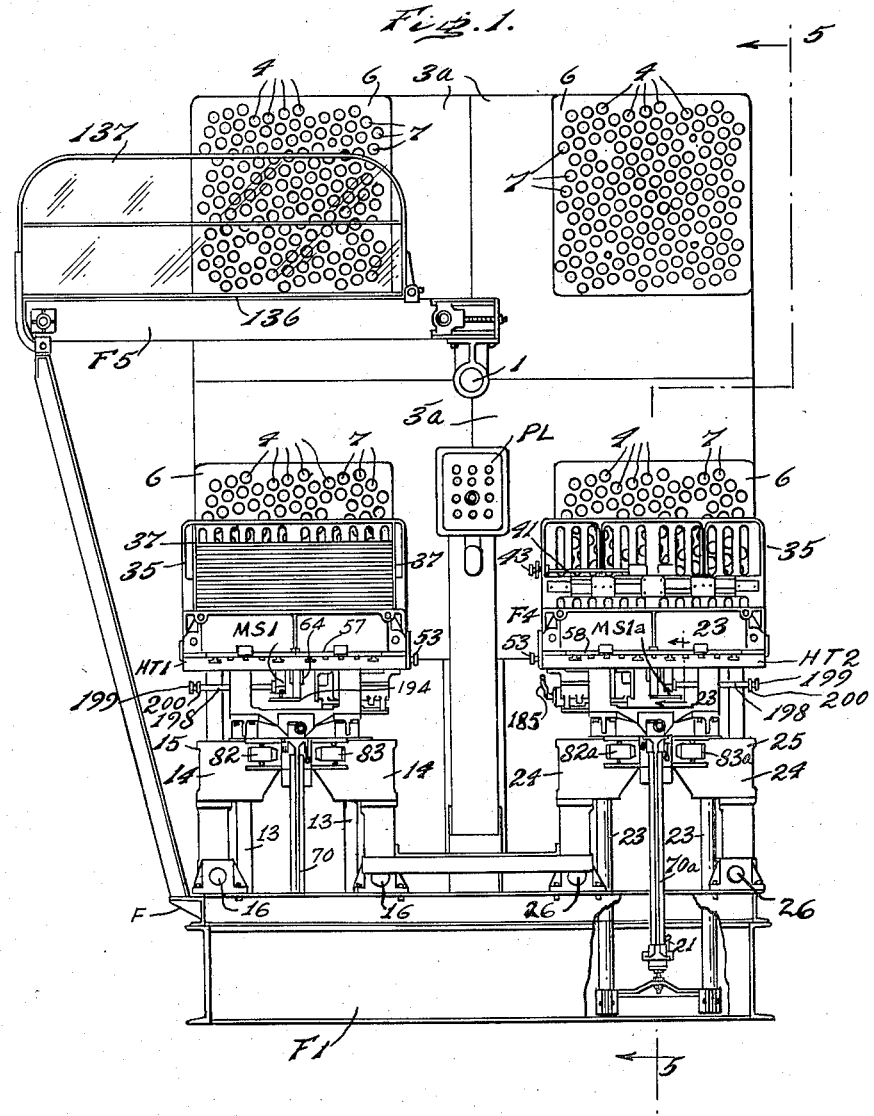
Figure 1 is a front elevational view of a partition assembling machine in accordance with the present invention, parts being broken away to show the details of construction.
Figure 23:
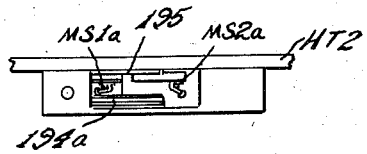
Fig. 23 is a fragmentary sectional view taken approximately on the line 23—23 of Fig. 1 showing a portion of the control mechanism.
Figure 4:
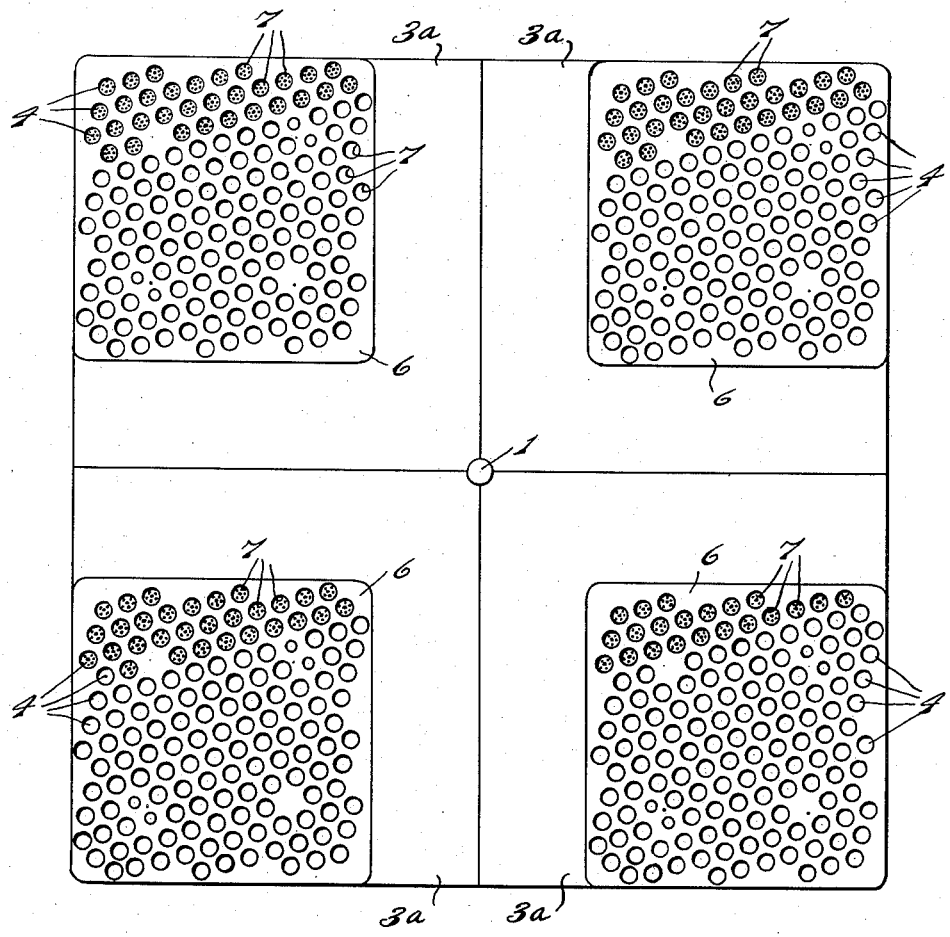
Fig. 4 is a front elevational view of the turret or indexing plate removed from the machine.
Figure 14:
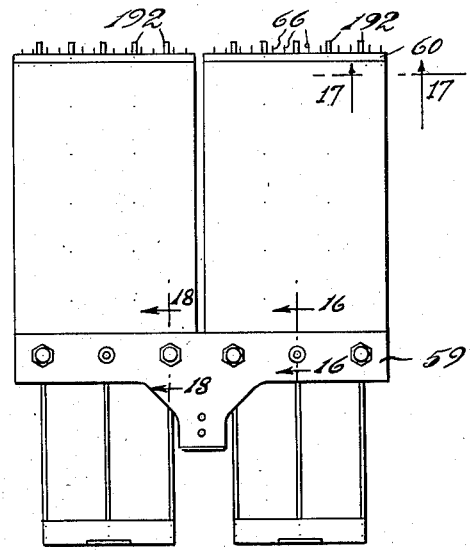
Fig. 14 is a top plan view of one of the ram and blade assemblies.
Figure 15:
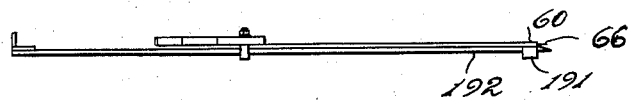
Fig. 15 is a side elevational view of the assembly shown in Fig. 14.
Figure 17:
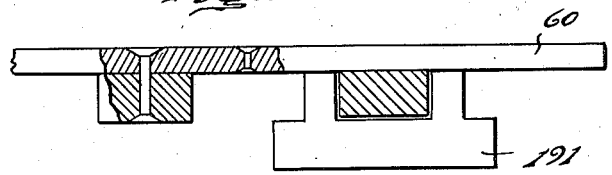
Fig. 17 is a fragmentary sectional view taken approximately on the line 17—17 of Fig. 14.

Each of the plates 3a of the turret 3 preferably successively serves as a station as hereinafter explained, and is provided, in rows and in columns, with spaced holders 4. The centers of the holders 4, as will be seen in Figs. 1 and 3, are, as to the rows, inclined with respect to the horizontal and as to the columns, inclined with respect to the vertical, so as to provide a maximum of possible gripping locations and a minimum of non-gripping locations as the edges of boards are presented thereto for gripping. Each of the holders 4 preferably comprises a multiplicity of relatively stiff wires or needles 5, embedded or secured in spaced relation in a suitable retaining material such as synthetic plastic, or the like, the wires or needles 5 projecting outwardly from and normal to the forward face of the turret 3.

Stripper plates 6 are provided, at each station location on the front face of the turret 3, having openings 7 therethrough for the wires or needles 5 of each holder 4. The stripper plates 6 have guide rods 8 and an actuator rod 9 extending through the turret plates 3a to a spider 10. A spring 11, mounted on each of the actuator rods 9 and engaging the rear faces of the turret plates 3a and the spiders 10, normally urges each of the stripper plates 6 rearwardly into engagement with the front face of the respective plate 3a but permits forward movement of the stripper plate 6 for removal of the assembled partition units.

Each of the actuator rods 9 has a rear end portion for engagement during its revolving movement with the turret 3, and as it approaches and leaves the fourth station with a cam strip 12 carried on the upright F2. The cam strip 12 has a face portion 12a for urging the respective stripper plates 6 forwardly and a face portion 12b permitting the retraction of the stripper plates 6 by the springs 11.

Disposed in front of the turret 3, and at the left as seen from the front, a first hopper table HT1 is provided, mounted on spaced vertical posts 13. The posts 13 are carried in vertical guides 14 which are mounted on a carriage 15. The carriage 15 is mounted for forward or rearward movement on horizontal rails 16 carried on the frame portion F1 and is horizontally positioned at the desired location, by a piston (not shown) in a fluid cylinder 18, manually controlled as hereinafter explained. The table HT1 is positioned at the desired levels or vertical locations by a piston in a fluid cylinder (not shown in detail), automatically or manually controlled as hereinafter explained, and which are similar in construction and operation to those hereinafter described in detail for the other hopper table HT2.

Disposed in front of the turret 3, and at the right as seen from the front, a second hopper table HT2 is provided, similar to the table HT1 and is mounted on posts 23 which are carried in vertical guides 24. The guides 24 are mounted on a carriage 25 for forward or rearward movement on horizontal rails 26, carried on the frame portion F1. The carriage 25 is horizontally positioned at the desired location by the piston in the cylinder 18. The table HT2 is positioned at the desired levels or vertical locations by a piston rod 29a connected to a piston 29 in a fluid cylinder 30, also automatically or manually controlled as hereinafter explained.

Each of the hopper tables HT1 and HT2 has a hopper frame or front gate assembly mounted thereon and extending vertically upwardly therefrom. These frames or gates are preferably identical in construction. The frame 35 has a central guide 36, a plurality of side guides 37 and intermediate guides 38, slidably mounted in the frame 35. The side guides 37 have inwardly extending toothed racks 39 engaging with pinions 40 carried by the guide 38, and are locked at the desired adjusted positions by a pointed locking rod 41 engaging a pointed locking rod 42. The rod 42 engages with and deflects or distorts one of the racks 39. The rod 41 at its outer end is threaded into the frame 35 and has an adjusting knob 43 and locking nut 44 on its outer threaded end.

The guides 36, 37 and 38 are adapted to be positioned with respect to a plane through the vertical center of the frame 35 in accordance with the size and number of partition strips to be carried, in stacked position, in front of the front face of the frame 35.

Each of the frames 35, along the lower edge thereof, and in spaced relation to the top faces of each of the tables HT1 and HT2 has a gage plate 45, positioned in accordance with the thickness of the partition strips to be fed, by positioner rods 46 normally urged upwardly by springs 47, and moved downwardly by cams 48 carried on cam rods 49 mounted on the frame 35 and adjusted by shaft operated gears 50 engaging worm gears 51 thereon. The gears 50 are carried on shafts 52 mounted in the frame 35 and are provided with adjusting knobs 53 and locking nuts 54.

The tables HT1 and HT2 have ram and blade assemblies 57 and 58 mounted thereon of similar construction. The ram and blade assemblies preferably each include a blade frame 59, having a blade 60 on the forward end thereof for engagement with a partition strip to be moved beneath the gage plates 45, the blade frames 59 being adjustably connected by studs 190 to actuator frames 61 which are slidably supported by guides 191 on the tables HT1 and HT2 for forward and rearward movement.

The frame 61 on the hopper table HT1 has a piston rod 62a (see Fig. 27) connected thereto and the frame 61 on the hopper table HT2 has a piston rod 63a connected thereto.

The blades 60 may, if desired, have holder pins 66 on the leading edges thereof for impaling and holding one or more partition strips and for moving such strip or strips from the bottom of the stack to and against the wires or needles 5 with which the same is aligned for impaling the partition strip or strips at an edge on such wires or needles 5, and return movement for a subsequent delivery of a partition strip or strips at a different table level. The piston rods 62a and 63a for the strip feeders 57 and 58 are operated respectively by pistons (not shown) in fluid cylinders 64 and 65.

Figure 16:
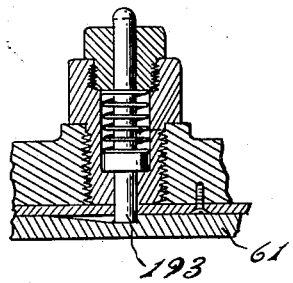
Fig. 16 is a fragmentary sectional view taken approximately on the line 16—16 of Fig. 14.
Figure 18:
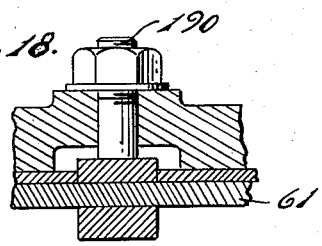
Fig. 18 is a fragmentary sectional view taken approximately on the line 18—18 of Fig. 14.

The partition strips advanced by the blade 60 for the hopper table HT1 can be supported, if desired, during their advance to the wires or needles 5 by supporting rods 192, adjustably mounted on the actuator frames 61 and with a releasable spring latch connection 193 (see Fig. 16) preventing excessive manual retraction of the rods 192.

Micro-switch control cams 194 and 194a are provided on the hopper tables HT1 and HT2 for movement with the frames 61. The micro-switches MS1 and MS1a, hereinafter more fully identified, are adjustably mounted on the hopper tables HT1 and HT2 in guides 195 for positioning by gearing (not shown) operated by shafts 198. The shafts 198 are rotatable by finger wheels 199 and locked by lock wheels 200. The micro-switch MS2a is hereinafter more fully identified. The cams 194 and 194a respectively operate micro-switches MS1 and MS1a at their forward positions and MS2a at its rearward position.

In order automatically to control the positioning of each of the tables HT1 and HT2 at the desired respective levels, strip holders or index frame assemblies 70 and 70a are provided, one on the front of each of the tables HT1 and HT2. As shown in Figs. 7, 8 and 9, holder rails 71 are provided on which end holders 72 are mounted and locked by studs 73 at the desired adjusted position. As previously indicated, a stock partition strip is employed or a group of stock partition strips are employed, and these, which are to serve as patterns, are centered from end to end on the holder rails 71, the end holders 72 placed in position and the strip or strips held by movable rails 74 positioned by cams 75 on the rods 76. The rods 76 have gears 77 thereon for actuation by pinions 78 on shafts 79 exteriorly accessible and having actuating knobs 80 and lock nuts 81 thereon.

The carriages 15 and 25, respectively, have mounted thereon limit switches LS1 and LS2, for purposes to be explained, operated at the ends of the vertical path of travel of the hopper tables HT1 and HT2 by adjustably mounted switch actuators 21 and 22.

The carriage 15 has thereon any suitable detecting or sensing mechanism, responsive to the positions of the slots in the partition strips, and for this purpose a photo-electric unit PE1 is preferred having a focused light source 82 and light sensitive or photo-electric cell 83 responsive to beams from the source 82 can be provided. The carriage 25 is provided with a similar photo-electric unit PE2 with a similar focused light source 82a and a light sensitive or photo-electric cell 83a.

The hopper table HT2 may have slidably mounted thereon, for rearward and forward movement, a supporting finger bar 150 having a dovetail recess 151 along the front edge thereof for the reception of complemental portions 152 of a plurality of bifurcated fingers 153. The fingers 153 serve to straighten partition strips mounted on the turret 3 at the prior station and facilitate the insertion of the strip or strips then being delivered.

The fingers 153 are held in the desired adjusted positions by a rod 154 freely rotatable in a slot 155 inwardly of the dovetail recess 151, the rod 154 being threaded along its length except for spaced portions 156. The rod 154 has a longitudinal flat face 157 to permit, when that face is turned to the complemental portions 152, the release of these portions from their engagement with the rod 154. When the fingers 153 are thus released they can be slid along the dovetail recess 151 and positioned so that their slots are at or straddling partition strips previously mounted on the turret 3 at the first station. Upon turning of the rod 154 so that the flat face 157 is disposed away from the finger portions 152, the fingers 153 will then be held at the selected locations. A set screw 158 may be provided for locking the rod 154 and preventing undesired movement of the fingers 153. A finger bar control cylinder 134 is provided within which a piston (not shown) is movable, having a piston rod 134a connected to the bar 150.

In order to index the turret shaft 1, a control plate 85 is secured thereto which for four stations has four flat faces 86. Pressure pads 87 are provided for engagement with an opposed pair of the faces 86, and are mounted in guides 88 carried by the frame section F2. The pressure pads 87 are controlled by pistons 89 in fluid cylinders 90 and 90a. The shaft 1 also has keyed thereto a sprocket 91 driven by a chain 92 from a sprocket pinion 93 on the output shaft of a speed reducer 94. The speed reducer 94 is driven by a positive displacement type reversible motor 95 to which fluid is supplied and from which fluid is exhausted, as hereinafter explained, fluid connections 96 and 97 being provided to the motor 95 for this purpose.

The turret shaft 1 also has mounted thereon a head 67 on which adjustably mounted pins 68 are provided for actuating a micro-switch MS9 and on which adjustably mounted pins 69 are provided for actuating a micro-switch MS10. The purpose of the micro-switches MS9 and MS10 is hereinafter explained.

A main driving electric motor M1 is provided, with controls as hereinafter described, which is connected in driving relation to a liquid pump 100. The pump 100 is connected through a cooler 101 to a storage tank or sump 102 and to a fluid delivery pipe 103. A fluid return connection 104 is also provided to the tank 102.

Figure 26:
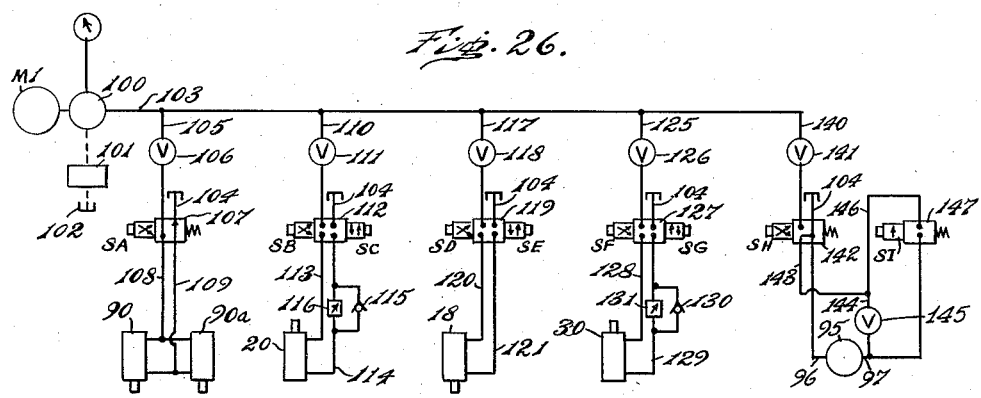
Fig. 26 is a diagrammatic view of the hydraulic system.

The fluid delivery pipe 103, as shown in Fig. 26, is connected by a fluid supply connection 105 having an adjustable needle valve 106 therein to a solenoid operated control valve 107. A spring returned solenoid SA controls the valve 107. A fluid connection 108 is connected to one end of each of the cylinders 90 and 90a. The other end of each of the cylinders 90 and 90a is connected by a fluid connection 109 to the solenoid valve 107. The valve 107 in unenergized condition normally connects the fluid connection 105 to the fluid connection 108 and the fluid connection 109 to the return connection 104.

Upon energization of the solenoid control valve 107, the fluid connection 108 is connected to the fluid connection 104 and the fluid connection 105 to the fluid connection 109, thus reversing the direction of the force applied in the cylinders 90 and 90a and retracting the pistons 89 therein.

The delivery pipe 103 is also connected by a fluid supply connection 110, having therein a feed valve 111, preferably pressure compensated, to a solenoid control valve 112. The control valve 112 is actuated from a shut-off position, as illustrated, to either one of two other positions by a solenoid SB or a solenoid SC. A fluid connection 113 extends to one end of the cylinder 20 and from the other end of the cylinder 20 a fluid connection 114 extends to the valve 112. The fluid connection 114 has, in parallel therein, a check valve 115 preventing flow towards the valve 112, and an adjustable spring urged counterbalance valve 116. The purpose of the valve 116 is to counteract the weight of the hopper table HT1 which otherwise would move when not desired.

The valve 112 has three positions, one in which the ports are shut off, another in which by energization of the solenoid SB the fluid connection 110 is connected to the fluid connection 114 while the fluid connection 113 is connected to the return connection 104, and another in which by energization of the solenoid SC the fluid connection 110 is connected to the fluid connection 113 and the fluid connection 114 is connected to the fluid connection 104.

The delivery pipe 103 is also connected by a fluid connection 117 through a shut-off valve 118 to a solenoid operated control valve 119. The control valve 119 is actuated from a shut-off position, as illustrated, to either one of two other positions by a solenoid SD or a solenoid SE. A fluid connection 120 extends from the valve 119 to one end of the cylinder 18 and from the other end of the cylinder 18 a fluid connection 121 extends to the valve 119.

The valve 119 has three positions, one in which the ports are shut off, another in which by energization of the solenoid SD the fluid connection 117 is connected to the fluid connection 121 while the fluid connection 120 is connected to the return connection 104, and another in which by energization of the solenoid SE the fluid connection 117 is connected to the fluid connection 120 while the fluid connection 121 is connected to the return connection 104.

The delivery pipe 103 is also connected by a fluid supply connection 125, having therein a feed valve 126, preferably pressure compensated, to a solenoid operated control valve 127. The control valve 127 is actuated from a shut-off position, as illustrated, to either one of two other positions by a solenoid SF or a solenoid SG. A fluid connection 128 extends to one end of the cylinder 30 and from the other end of the cylinder 30 a fluid connection 129 extends to the valve 127. The fluid connection 129 has, in parallel therein, a check valve 130 preventing flow towards the valve 127, and an adjustable spring urged counterbalance valve 131. The purpose of the valve 131 is similar to that of the valve 116 but for the hopper table HT2.

The delivery pipe 103 is also connected by a fluid connection 140 through a feed valve 141, preferably pressure compensated, to a solenoid controlled spring returned valve 142. The control valve 142 is actuated from a shut-off and discharge position as illustrated, to a different position by a solenoid SH. A fluid connection 143 extends from the valve 142 and the fluid connection 96 of the motor 95 extends thereto.

The fluid connection 143 is branched with a connection 144 connected to the motor fluid connection 97 through an adjustable needle valve 145 and with a connection 146 extending to a solenoid operated spring returned valve 147. The valve 147 is actuated from a shut-off position, as illustrated, to a position for flow, by a solenoid SI. The fluid connection 97 extends to the valve 147.

Figure 27:
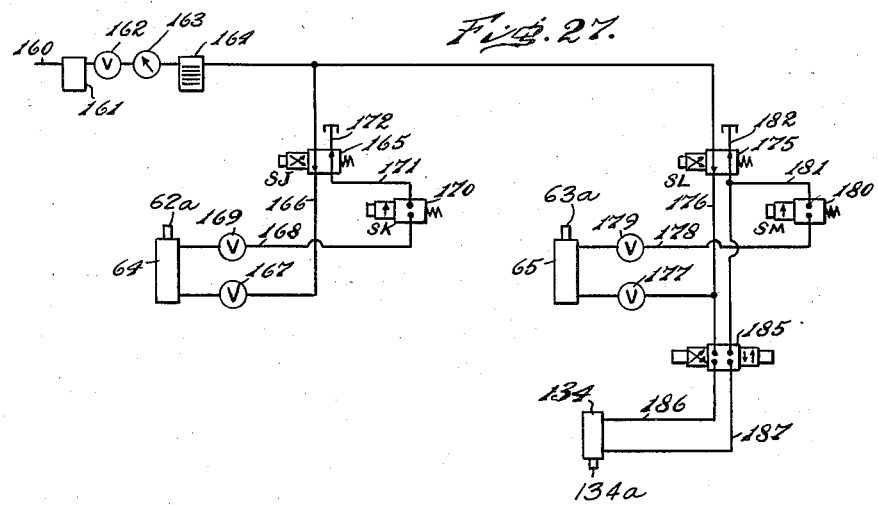
Fig. 27 is a diagrammatic view of the pneumatic system.

A pneumatic power and control system for feeding the partition strips is also preferably employed and is illustrated diagrammatically in Fig. 27.

A fluid supply connection 160 is provided to a suitable source of gaseous fluid, such as air, under pressure, which is connected through a suitable filter 161, adjustable pressure regulator 162 having a pressure gage 163, and a lubricator 164.

The fluid connection 160 extends to a solenoid actuated spring returned control valve 165. The control valve 165 is actuated from a normally open position, as illustrated, to another flow direction reversing position by a solenoid SJ. A fluid connection 166 is provided extending from the valve 165 to one end of the cylinder 64, an adjustable control valve 167 being interposed therein. From the other end of the cylinder 64 a fluid connection 168 is provided, having an adjustable control valve 169 therein which extends to a solenoid actuated spring returned control valve 170. The control valve 170 is normally in shut-off position but is actuated by a solenoid SK to fluid flow position. The valve 170 is connected to the valve 165 by a fluid connection 171. The valve 165 has a discharge connection 172.

The fluid connection 160 also extends to a solenoid actuated spring returned control valve 175. The control valve 175 is actuated from a normally open position, as illustrated, to another flow direction reversing position, by a solenoid SL. A fluid connection 176 is provided extending from the valve 175 to one end of the cylinder 65, an adjustable control valve 177 being interposed therein. From the other end of the cylinder 65, a fluid connection 178 is provided, having an adjustable control valve 179 therein, which extends to a solenoid operated spring returned control valve 180. The control valve 180 is normally in shut-off position but is actuated by a solenoid SM to fluid flow position. The valve 180 is connected to the valve 175 by a fluid connection 181. The valve 175 has a discharge connection 182.

The fluid connection 176 also extends to a manually operable valve 185. The valve 185 can be actuated from a normally shut-off position, as illustrated, to either of two other positions, one for direct flow through a fluid connection 186 to one end of the finger bar cylinder 133 and return through a fluid connection 187 and the other for reverse flow to the cylinder 133 through these fluid connections.

The solenoids SA to SM, inclusive, are operated in the proper timed relation and for this purpose there are employed push-buttons, generally identified as PB and their contacts as CPB; switches, generally identified as SW and their contacts as CSW; micro-switches, generally identified as MS; limit switches generally identified as LS; and relays generally designated as R, with preceding or following letters, and their contacts designated with the same character as the specific relay but preceded by C.

The push-buttons PB are identified as PB1, PB2 and PB3.

The switches SW are identified respectively as SW6, with contacts CSW61, CSW62 and CSW63; SW9, with contacts CSW91, CSW92 and CSW93; SW11, with contacts CSW111 and CSW112.

The micro-switches MS are identified respectively as MS1, MS1a, MS2, MS2a, MS3, MS6, MS7, MS9 and MS10.

The limit switches LS, are identified as LS1 and LS2.

The relays R are identified as relay MR, with normally open contacts CMR1, CMR2 and CMR3; relay PR with normally open contacts CPR1, CPR2 and CPR3; relay RA with normally closed contacts CRA1 and CRA2, and normally open contacts CRA3; relay RB with normally closed contacts CRB1 and CRB2 and normally open contacts CRB3 and CRB4; relay RC with normally closed contacts CRC1 and CRC2 and normally open contacts CRC3; relay RD with normally closed contacts CRD1 and CRD2 and normally open contacts CRD3 and CRD4; relay R1 with normally closed contacts CR12 and normally open contacts CR11 and CR13; relay R2 with normally closed contacts CR22 and normally open contacts CR21 and CR23; relay R3 with normally closed contacts CR31, CR33 and CR35, and normally open contacts CR32 and CR34; and relay R4 with normally closed contacts CR41 and normally open contacts CR42.

Figure 28:
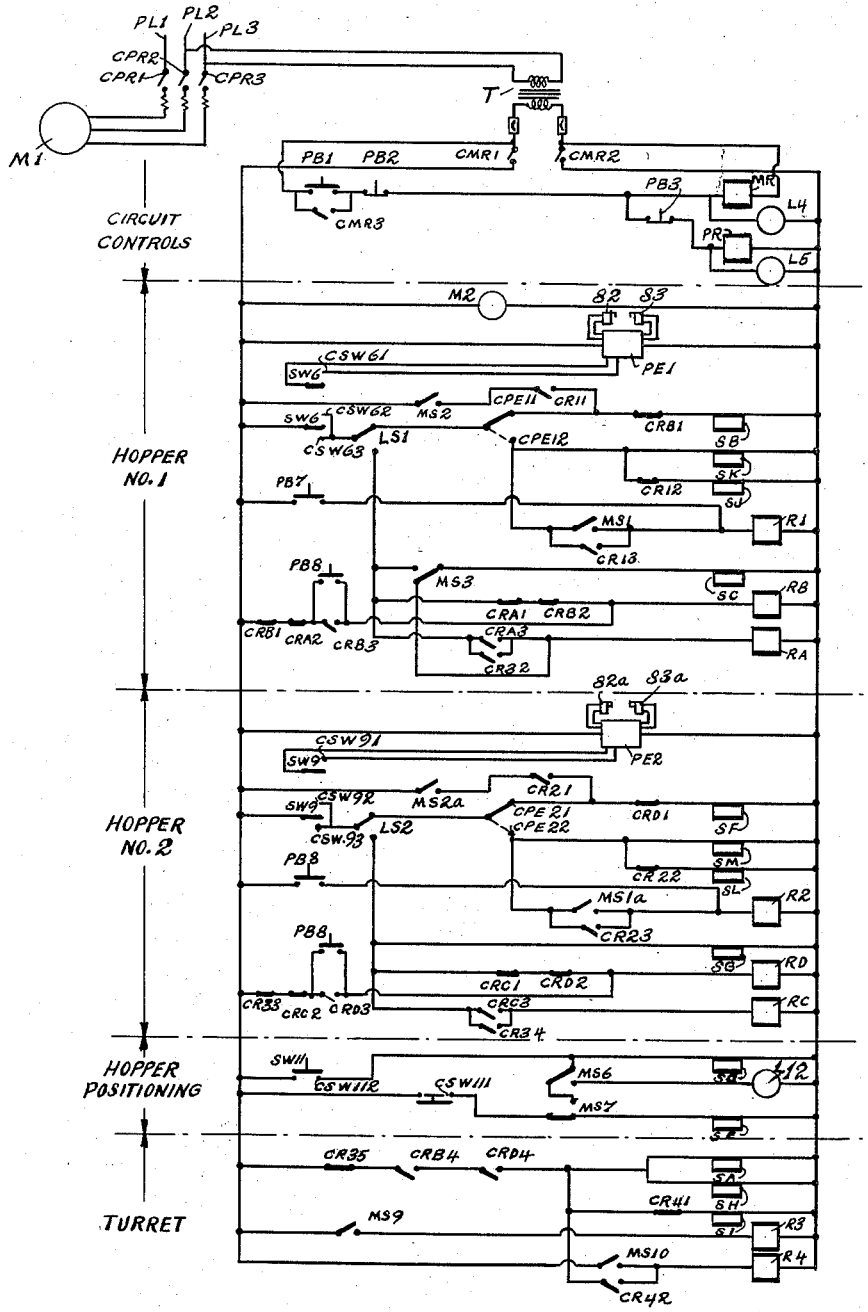
Fig. 28 is a diagrammatic view of the electrical control system and circuit connections.

The circuit connections are illustrated in Fig. 28 and include power leads PL1, PL2 and PL3, connected to any suitable source of electrical energy and to which the motor M1 is connected.

A transformer T may be provided for stepping down the voltage from the power leads PL2 and PL3 to a voltage of the order of 110 volts and is preferably connected through a normally open manually operable push-button or starting switch PB1, and a normally closed manually operable push-button or stop switch PB2 for controlling the energization or deenergization of a control relay MR. The relay MR has normally open contacts CMR1 and CMR2 and a holding contact CMR3.

The conveyor motor M2 is directly connected to this circuit which includes the contacts CMR1 and CMR2 and will be energized so long as these contacts are closed. An indicator light L4 may be provided to indicate the energization of the circuit for the relay MR.

The motor M1 is controlled by a normally closed manually operable push-button PB3, in series with switch PB1 or contact CMR3. The push-button PB3 in turn controls the energization of the pump motor control relay PR, which has normally open contacts CPR1, CPR2 and CPR3. An indicator light L5 may be provided to indicate the energization of the pump motor control relay PR.

The power connections to the photo-electric units PE1 and PE2 and their respective light sources 82 and 82a may also be connected to this circuit and thus are energized so long as the contacts CMR1 and CMR2 are closed. The photo-electric unit PE1 has a contact CPE11 which is energized, as hereinafter explained, for an interrupted light beam from the source 82 to the cell 83, and a contact CPE12 which is energized when the light beam from the source 82 to the cell 83 is uninterrupted.

Control circuits are also provided for the hopper tables HT1 and HT2 which are quite similar.

The control circuits for the hopper table HT1 will be described first.

A selector switch SW6 and blade reverse push-button PB7 are provided which control the photo-electric unit PE1, the solenoids SB, SK, SJ, and SC, and the relays R1, RB and RA.

The selector switch SW6 has three positions: a neutral or "Off" position, a "Run" position, and a "Reset" position. In the "Off" position no power is supplied for actuation of the hopper table HT1.

The switch SW6 has a contact CSW61 effective in the "Run" position for energizing the blocking terminals of the photo-electric unit PE1, but it will be noted that in the reset position the hopper table HT1 can be actuated without any action of the feed blades 60 since the blocking terminals of the photo-electric unit PE1 are opened.

The selector switch SW6 has contacts CSW62 and CSW63, one of which is effective either in "Run" or "Reset" position for the delivery of current to the directional limit switch LS1 in either position. The purpose of the limit switch LS1 is to cause the hopper table HT1 to raise or lower according to the position of the switch LS1. When the current flows through contact CPE11 and the normally closed contact CRB1 of the relay RB, the solenoid SR is energized, causing the hopper table HT1 to rise. When the current flows through the contact CPE12, and the normally closed contact CR12 of the relay R1, the solenoids SK and SJ are energized and the solenoid SB is deenergized. The hopper table HT1 will thus be caused to stop and the feed blade 60 connected to the piston 17 will move forward until the cam 194 movable with its blade 60 depresses the micro-switch MS1 at the end of its forward position. The relay R1 is thus caused to be energized, closes its normally open holding contact CR13, and will remain in energized condition until the contacts CPE12 are opened. The contacts CR11, CR12 and CR13 will then reverse their positions.

The solenoid SJ will be deenergized by the opening of contact CR12, thereby causing the feed blade 60 to reverse and as this blade 60 returns to its original position the cam 194 will pass over the micro-switch MS2 closing the circuit to the solenoid SB through the now closed contacts CR11, thus causing the table HT1 to rise again until the light beam from the source 82 to the cell 83 is again interrupted. At this time the photo-electric contact CPE11 will be energized, and contact CPE12 will be deenergized, thus deenergizing the solenoid SK, so that the blade 60 will be stopped at the desired location.

The cycle for feeding a partition strip of the first group is now completed and the hopper table HT1 will rise again until the photo-cell 83 is again acted upon by the light beam from the source 82, at which time the cycle will be repeated.

It should be noted that the micro-switch MS2 is connected in series with the contact CR11 so that the solenoid SB cannot be reenergized when PE1 is again energized without the blade 60 completing its prescribed cycle. It is accordingly immaterial whether the blade 60 comes to rest with the cam 194 depressing the micro-switch MS2 or if the micro-switch MS2 is depressed during the feed movement of the blade 60.

The cycle heretofore described will be repeated according to the number of slots in the partition pattern piece of the first group until the hopper table HT1 reaches the end of its travel, at which time the limit switch LS1 will effect a reversal of direction of movement of the hopper table HT1, thereby deenergizing the solenoid SB and energizing the solenoid SC, thus causing the hopper table HT1 to descend.

Upon deenergization of the solenoid SB and energization of the solenoid SF, the direction of force applied by the fluid in the cylinder 20 is reversed by the valve 112. Upon the connection of the fluid connection 113 to the pressure in the fluid connection 110 and the connection of the fluid connection 114 to the return line 104, the check valve 115 prevents flow in the reverse direction, except through the pressure loaded valve 116 which only opens when there is sufficient pressure exerted against it, as determined by its spring setting, so that the weight of the hopper table HT1 is counteracted.

The limit switch LS1 is also connected to energize the relay RB and reverse the contacts marked CRB. It will be noted that the relay RB, after the initiation of the energization by the switch LS1 is energized through contacts CR31, CRA2 and CRB3 and no longer through LS1. The solenoid SB cannot be energized when the hopper table HT1 finishes its descent, so that the limit switch LS1 is returned to its original position, because in that position the circuit is interrupted.

The control circuits for the hopper table HT2 will now be described.

A selector switch SW9 and blade reverse push-button PB10 are provided, which control the photo-electric unit PE2, the solenoids SF, SM, SL, and SG, and the relays R2, RD and RC.

The selector switch SW9, like the selector switch SW6, has three positions: a neutral or "Off" position, a "Run" position, and a "Reset" position. In the "Off" position no power is supplied for actuation of the hopper table HT2.

The switch SW9 has a contact CSW91 effective in the "Run" position for energizing the blocking terminals of the photo-electric unit PE2, but it will be noted that in the reset position, the hopper table HT2 can be actuated without any action of the feed blades 60 since the blocking terminals of the photo-electric unit PE2 are opened.

The selector switch SW9 has contacts CSW92 and CSW93, one of which is effective either in "Run" or in "Reset" position for the delivery of current to the directional limit switch LS2 in either position. The purpose of the limit switch LS2 is to cause the hopper table HT2 to raise or lower according to the position of the switch LS2. When the current flows through contact CPE21 and the normally closed contact CRD1 of the relay RD, the solenoid SF is energized, causing the hopper table HT2 to rise. When the current flows through the contact CPE22, and the normally closed contact CR22 of the relay R2, the solenoids SM and SL are energized and the solenoid SF is deenergized. The hopper table HT2 will thus be caused to stop and the feed blade 60 connected to the piston 27 will move forward until the cam 194a movable with the blade 60 depresses the micro-switch MS1a at the end of its forward position. The relay R2 is thus caused to be energized, closes its normally open holding contact CR23, and will remain in energized condition until the contacts CPE22 are opened. The contacts CR21, CR22 and CR23 will then reverse their positions.

The solenoid SL will be deenergized by the opening of contact CR22, thereby causing the feed blade 60 to reverse and as this blade 60 returns to its original position the cam 194a will pass over the micro-switch MS2a closing the circuit to the solenoid SF through the now closed contacts CR21, thus causing the table HT2 to rise again until the light beam from the source 82a to the cell 83a is again interrupted. At this time the photo-electric contact CPE21 will again be energized, and contact CPE22 will be deenergized, thus deenergizing the solenoid SM, so that the blade 60 will be stopped at the desired location.

The cycle for feeding a partition strip of the second group into engagement with those of the first group is now completed and the hopper table HT2 will rise again until the photo-cell 83a is again acted upon by the light beam from the source 82a, at which time the cycle will be repeated.

It should be noted that the micro-switch MS2 is connected in series with the contact CR21 so that the solenoid SF cannot be reenergized when PE2 is again energized without the blade 60 completing its prescribed cycle. It is accordingly immaterial whether the blade 60 comes to rest with the cam 194 depressing the micro-switch MS2 or if the micro-switch MS2a is depressed during the feed movement of the blade 60.

The cycle heretofore described will be repeated according to the number of slots in the partition strip of the second group until the hopper table HT2 reaches the end of its travel, at which time the limit switch LS2 will effect a reversal of direction of movement of the hopper table HT2, thereby deenergizing the solenoid SF and energizing the solenoid SG, thus causing the hopper table HT2 to descend.

Upon deenergization of the solenoid SF and energization of the solenoid SG, the direction of the force applied by the fluid in the cylinder 30 is reversed by the valve 127. Upon the connection of the fluid connection 128 to the pressure in the connection 125 and the connection of the fluid connection 129 to the return line 104, the check valve 130 prevents flow in the reverse direction except through the pressure loaded valve 131, which only opens when there is sufficient pressure exerted against it, as determined by its spring setting, so that the weight of the hopper table HT2 is counteracted.

The limit switch LS2 is also connected to energize the relay RD and reverse the contacts marked CRD. It will be noted that the relay RD, after the initiation of the energization by the switch LS2, is energized through contacts CR33, CRC2 and CRD3 and no longer through LS2. The solenoid SF cannot be energized when the hopper table HT2 finishes its descent, so that the limit switch LS2 is returned to its original position, because in that position the circuit is interrupted. It should also be noted that the solenoids SA, SH and SI are energized when the contact CRD4 is closed. This contact CRD4 will be closed when the hopper table HT2 reaches the upper limit of its travel.

On the hopper table HT1, a partition strip hold down bar 205 is provided, carried on end brackets 206 mounted on a rack 207 slidable on the side edges of the hopper table HT1. An abutment block 208, carried on the rack 207, is provided for engagement, upon its retraction, with a micro-switch MS3, on the hopper table HT1, to delay the descent of the hopper table HT1 until the turret 3 has been indexed. Interference of the bar 205 with partition strips mounted on the turret 3 is thus avoided. The solenoid SC is connected to the common terminal of this switch, the other terminals being connected to the circuit controlled directly by the limit switch LS1 and the circuit controlled by the relay RA. Accordingly, when the micro-switch MS3 is in the closed position the solenoid SC will be energized as soon as the limit switch LS1 makes contact. If, however, the micro-switch MS3 is in the open position, the solenoid SC will not be energized until the relay RA is energized. The time of energization of relay RA, in its relationship to the turret cycle, is hereinafter explained.

In order to provide for the retraction of the feed blade 60, in the event that it has not been able to make a full forward stroke because of jamming, or for any other reason, so that the micro-switch MS1 has not been closed, a blade reverse push-button PB7 is provided, which is directly connected to the circuit controlled by the contacts CMR1 and CMR2, and to the relay R1. The switch SW6 should be in its "Off" position before the push-button PB7 is actuated.

The control of the turret 3 is effected by means of the solenoids SA, SH and SI, and, as illustrated, the solenoids SA and SM are connected in parallel and will therefore operate together. These solenoids, by the inclusion of the contacts CRB4 and CRD4 are energized only at a predetermined time, and after both the hopper tables HT1 and HT2 have reached their uppermost positions. The turret 3 commences its cycle upon the energization of the solenoids SA, SH and SI and when the turret has revolved through an angle of approximately 80° to 85°, the micro-switch MS10 will be depressed to energize the relay R4 and holding contact CR42 to maintain the energization. The relay R4 will remain in energized condition until the turret 3 has moved approximately 89°, at which time relay R3 will be energized momentarily by means of a micro-switch MS9 which serves to reset the entire circuit for the next cycle. This will be readily understood by noting the effect of a momentary change of all the contacts CR3.

It should also be noted that if the limit switch LS1 is in its downward position, the relay RB will be deenergized and the relay RA will be energized. This may occur if either of the hopper tables HT1 or HT2 is descending at the time the CR3 contacts are energized, and will always occur if the limit switch MS3 on the hopper table HT1 is in the open position. It will also be noted that the solenoids SA and SH will return to their original deenergized state.

Upon the completion of a cycle there will be a repetition of the action previously described, and this will continue until one of the hopper table switches SW6 or SW9 is returned to the "Off" position.

If desired, of course, the machine may be stopped at any time by depressing the stop-button PB2.

In order to position automatically the hopper tables HT1 and HT2 a hopper table positioning switch SW11 is provided, which cooperates with micro-switches MS6 and MS7. The switch SW11 has three positions, a "Run" position, a forward or "For" position, and a reverse or "Rev" position, and a push-button for controlling current flow. The switch SW11 is at a neutral or non-energizing position when at the "Run" position, permits completing a circuit through contacts CSW11 when at the "For" position upon actuation of the push-button, and permits completing a circuit through the contacts CSW112 when at the "Rev" position and upon actuation of the push-button.

With the switch SW11 in the "Run" position the contacts CSW111 and CSW112 are in their open positions.

With the switch SW11 in the forward position, and a circuit completed through the contact CSW111, current will flow to the common of the micro-switch MS7. The solenoid SE will then be energized until a cam 202 attached to the hopper tables HT1 and HT2 depresses the forward micro-switch MS7 and breaks the circuit for the solenoid SE. This in turn causes the lamp L12 to be lighted, thus indicating that the hopper tables HT1 and HT2 are at their proper positions.

If the hopper tables HT1 and HT2 should override the desired location as determined by the location of the micro-switch MS7, the micro-switch MS6 will be moved to energize the solenoid SD, which will reverse the movement.

In order to reverse the action, the switch SW11 is moved to reverse position so that with the contacts CSW111 open and the contacts CSW112 closed, current will now flow only to the solenoid SD to retract.

A manual control of the turret 3 is provided by means of the manually operable push-button PB8 which, when pressed, will permit the energization of the relays RB and RD. The push-button PB8, in effect, takes the place of the limit switches LS1 and LS2 and will thus cause the turret 3 to complete one cycle of 90°.

A control panel or station PL is provided, preferably on an upright F4, readily accessible from the front of the machine, on which is mounted the indicator lights L4, L5 and L12, the starting push-button PB1, the stop push-button PB2, the pump motor control push-button PB3, the selector switch SW6 for the hopper table HT1, the blade reverse push-button PB7 for the hopper table HT1, the turret manual control push-button PB8, the selector switch SW9 for the hopper table HT2, the blade reverse push-button PB10 for the hopper table HT2, and positioning switch SW11.

A receiving platform 136 is provided, carried by frame section F5, with a guide plate 137, which may be transparent, connected thereto. A conveyor belt 138 driven by a motor M2 can be provided for removal of the completed partition assemblies.

From the foregoing it will be clear that the machine can be readily adjusted to accommodate partition strips of different thicknesses on each of the hopper tables HT1 and HT2, as well as to accommodate partition strips of different lengths on each of the hopper tables HT1 and HT2. If partition strips of different lengths are employed, one of the partition strips from the hopper table HT1 is used as the pattern strip carried by the hopper table HT2 for controlling its movements, and one of the partition strips from the hopper table HT2 is used as the pattern strip for the hopper table HT1 for controlling its movements. A plurality of like or different partition strips can also be employed on each of the hopper tables for simultaneously operating on a plurality of partition assemblies at each station.

With the hopper frames 35 in proper adjusted position as desired, with the gage plates 45 adjusted to the proper location in accordance with the thickness of the partition strips to be used, with pattern strips mounted in place in the strip holders 70 and 70a, and with the partition strips in place on the hopper tables HT1 and HT2 in front of the gates 35, the machine is ready for operation.

Operations are commenced by pushing the starting button PB1 so that the pump relay PR is energized, the pump motor M1 and pump 100 are placed in operation, the conveyor motor M2 is actuated, and the photo-electric units PE1 and PE2 are energized.

The hopper tables HT1 and HT2 can then be positioned rearwardly towards the turret 3 by the switch SW11 as determined by the setting of the cam 202 for the micro-switches MS6 and MS7.

Upon the simultaneous energization of the solenoids SA, SH and SI, energization of the solenoid SA is effective on the valve 107 to cause the pressure in the turret indexing cylinders 90 and 90a to retract the pistons 89, energization of the solenoid SH operates the valve 142 to supply pressure fluid to the motor 95 to rotate the shaft 1 and the turret 3 thereon, and energization of the solenoid SI operates the valve 147 to permit unrestricted exhaust of fluid from the motor 95.

The motor 95 will operate at full speed until the turret 3 has moved approximately 70° from its initial position at which time one of the actuators will operate the micro-switch MS10 to deenergize the solenoid SI, close the valve 147, and cause the exhaust from the motor 95 to pass through the restriction of the needle valve 195. This restriction effects a braking action on the motor 95 and turret 3 which is applied until the turret 3 has revolved about 85° from its initial position and is virtually stopped. The cycle is then completed by the simultaneous deenergization of the solenoids SA and SH by the micro-switch MS9 which deenergizes the relay R3 and opens the contact CR35. Deenergization of the solenoid SA permits valve 107 to return to its original position so that the cylinders 90 and 90a are effective, by the engagement of the pressure pads 87 with a pair of faces 86 of the control plate 85, to lock the turret 3 in position. Deenergization of the solenoid SH causes the valve 142 to return to its initial position in which both fluid connections 96 and 143 are connected to the return line 104 so that the motor 95 can revolve freely in either direction.

The turret 3 will remain locked until the completion of the feeding action of the hopper tables HT1 and HT2 whereupon it will again move as just described, the movement being initiated when the relay R3 is deenergized and the contacts CR35 are closed while at the same time relays RB and RD are energized so that contacts CR34 and CRD4 are also closed.

The vertical movement of the hopper tables HT1 and HT2 is accomplished by the cylinders 20 and 30, and the cylinders 64 and 65 supply the forces for moving the blades 60.

The photo-electric unit PE1 controls the cylinders 20 and 64 and the photo-electric unit PE2 controls the cylinders 30 and 65.

With the partition strips which are serving as patterns clamped in the strip holders 70 and 70a, the partition strips will control the reception of light by the photo-electric cells 83 and 83a from the sources 82 and 82a.

The length of vertical travel of the hopper tables HT1 and HT2 is determined by the setting of the switch actuators 21 and 22 for controlling the limit switches LS1 and LS2.

The operation of the hopper tables HT1 and HT2 as controlled by the photo-electric units PE1 and PE2 has previously been pointed out.

The finger bar cylinder 174 is used to extend and retract the finger bar 150 and is controlled by the manually operated four way valve 185. When the finger bar 150 is utilized, its normal operation is to run in the same direction as the cylinder 65, the reverse direction being used only for set-up.

Proper horizontal setting of the hopper tables HT1 and HT2 is accomplished by the cylinder 18 as previously pointed out and is controlled by the valve 119 and the solenoids SD and SE. When the set-up has been made, the cam 202 is positioned in its proper relation to the micro-switches MS6 and MS7 so that any displacement is compensated by the energization of either the solenoid SD or SE. Manual control by the switch SW11 is also available.

The other available controls have heretofore been referred to and further discussion thereof is not believed necessary for an understanding of the operation of the machine.

We claim:

1. A partition strip assembling machine comprising a turret having a face portion, partition strip retaining members on said face portion, members for positioning said turret at predetermined angular positions, a first hopper table at a predetermined location with respect to said turret and carrying a plurality of partition strips, a pattern strip holder for said first hopper table, members for holding a pattern strip on said holder, control members responsive to said pattern strip for controlling the successive positioning of said hopper table at predetermined positions with respect to said turret face portion, means for successively delivering partition strips from said first hopper table in spaced relation at each of said positions into engagement with said strip retaining means, a second hopper table at a different predetermined location with respect to said turret and carrying a plurality of partition strips for engagement with said first partition strips, a pattern strip holder for said second hopper table, members for holding a pattern strip on said holder, control members responsive to said pattern strip for controlling the successive positioning of said second hopper table at predetermined positions with respect to said turret face portions, means for successively delivering partition strips from said second hopper table at each of said positions into engagement with partition strips from said first hopper table, and means for controlling said delivering means and said turret positioning means in timed relation.

2. A partition strip assembling machine as defined in claim 1 in which the control members include light sensitive devices.

3. A partition strip assembling machine comprising a turret having a vertical face portion, partition strip retaining members on said face portion, members for positioning said turret at predetermined angular positions, a first hopper table at a predetermined location with respect to said turret and carrying a plurality of partition strips, a pattern strip holder for said first hopper table, members for holding a pattern strip on said holder, control members responsive to said pattern strip for controlling the successive positioning of said hopper table at predetermined vertical positions with respect to said turret face portion, blade means for successively delivering partition strips from said first hopper table at each of said vertical positions into engagement with said strip retaining means, a second hopper table at a different predetermined location with respect to said turret and carrying a plurality of partition strips for engagement with said first partition strips, a pattern strip holder for said second hopper table, members for holding a pattern strip on said holder, light responsive control members responsive to said pattern strip for controlling the successive positioning of said second hopper table at predetermined vertical positions with respect to said turret face portions, means for successively delivering partition strips from said second hopper table at each of said vertical positions into engagement with partition strips from said first hopper table, and means for controlling said delivering means and said turret positioning means in timed relation.

4. In a partition strip assembling machine, a turret having a shaft, a vertical face portion carried by said shaft and having thereon partition strip retaining members at a plurality of locations, and means for positioning said shaft including a fluid operated driving member, a control member having a plurality of opposed pairs of control portions thereon corresponding to respective stations at which said turret is to be positioned, opposed fluid pressure responsive members respectively engaging an opposed pair of said control portions in holding engagement, and means for releasing said pressure responsive members.

5. In a partition strip assembling machine, a turret having a shaft, a vertical face portion carried by said shaft and having thereon partition strip retaining members at a plurality of locations, and means for positioning said shaft including a fluid operated driving member, a control plate having a plurality of pairs of opposed flat control portions on the marginal edge thereof corresponding to respective stations at which said turret is to be positioned, opposed fluid pressure responsive members having flat portions respectively engaging an opposed pair of said opposed control portions in holding engagement, and means for releasing said pressure responsive members.

6. In a partition strip assembling machine, a turret having a vertical face with partition strip retaining members thereon, and means for delivering partition strips thereto comprising a hopper table, members for successively positioning said table at different levels with respect to said turret face, members for controlling said last mentioned positioning members including a holding member for a pattern strip and portions responsive to said pattern strip, and strip delivering members for successively advancing partition strips from said hopper table at each of said levels.

7. In a partition strip assembling machine, a turret having a vertical face with partition strip retaining members thereon, and means for delivering partition strips thereto comprising a hopper table, members for successively positioning said table at different levels with respect to said turret face, members for controlling said last mentioned positioning members including a holding member for a pattern strip and light sensitive portions responsive to said pattern strip, and strip delivering members for successively advancing partition strips from said hopper table at each of said levels.

8. In a partition strip assembling machine, a partition strip receiving and retaining member, a partition strip hopper member, and members for moving said hopper member with respect to said first mentioned member including a pattern strip holder having a pattern strip thereon, a light source, a photo-cell responsive to light from said source and connected for controlling the positioning of said hopper member, and means for relatively moving said pattern strip and said photo-cell.

9. In a partition strip assembling machine, a frame, a partition strip receiving and retaining member movably mounted on said frame, a partition strip hopper member movably mounted on said frame, and members for moving said hopper member with respect to said first mentioned member including a pattern strip holder having a pattern strip thereon, a light source, a photo-cell responsive to light from said source and connected for controlling the positioning of said hopper member, said light source and said photo-cell being carried by said frame, and means interposed between said frame and said hopper member for relatively moving said pattern strip and said photo-cell.

References Cited in the file of this patent

UNITED STATES PATENTS

| | | |
|---|---|---|
| 1,431,679 | Noda | Oct. 10, 1922 |
| 2,131,967 | Peropat | Oct. 4, 1938 |
| 2,414,336 | Shields | Jan. 14, 1947 |
| 2,656,785 | Gannon et al. | Oct. 27, 1953 |
| 2,676,522 | Baker et al. | Apr. 27, 1954 |
| 2,740,629 | Harred | Apr. 3, 1956 |
| 2,743,103 | Ebner | Apr. 24, 1956 |

FOREIGN PATENTS

| | | |
|---|---|---|
| 2,676,522 | Germany | Apr. 27, 1954 |